(12) United States Patent
Ernsberger (10) Patent No.: US 7,093,495 B2
(45) Date of Patent: Aug. 22, 2006

(54) PRESSURE SENSOR (75) Inventor: Craig Ernsberger, Granger, IN (US)

(73) Assignee: CTS Corporation, Elkhart, IN (US)

( * ) Notice: Subject to any disclaimer, the term of this patent is extended or adjusted under 35 U.S.C. 154(b) by 83 days.

(21) Appl. No.: 10/716,752

(22) Filed: Nov. 19, 2003

(65) Prior Publication Data
US 2005/0022605 A1 Feb. 3, 2005

Related U.S. Application Data (60) Provisional application No. 60/490,648, filed on Jul. 28, 2003.

(51) Int. Cl.
G01L 9/00 (2006.01)
(52) U.S. Cl. ..................... 73/754; 361/283.1
(58) Field of Classification Search .............. 73/715, 73/716, 717, 719, 720, 721, 753; 361/283.4
See application file for complete search history.

(56) References Cited

U.S. PATENT DOCUMENTS

| 4,587,840 A | 5/1986 | Dobler et al. |
| 4,932,266 A * | 6/1990 | Bauer et al. ................. 73/727 |
| 5,197,334 A | 3/1993 | Guziak |
| 5,209,122 A | 5/1993 | Matly et al. |
| 5,317,920 A | 6/1994 | Kremidas |
| 5,587,535 A | 12/1996 | Sasaki et al. |
| 5,867,886 A | 2/1999 | Ratell et al. |
| 5,898,359 A | 4/1999 | Ellis |
| 5,939,637 A | 8/1999 | Pitzer et al. |
| 5,948,989 A | 9/1999 | Ichikawa et al. |
| 6,003,379 A | 12/1999 | Ichikawa et al. |
| 6,003,380 A | 12/1999 | Sasaki et al. |
| 6,022,756 A | 2/2000 | Sparks et al. |
| 6,176,137 B1 | 1/2001 | Sasaki et al. |
| 6,267,010 B1 | 7/2001 | Hatanaka et al. |
| 6,269,534 B1 | 8/2001 | Mattmann et al. |
| 6,725,514 B1 | 4/2004 | Moyer et al. |
| 6,782,755 B1 * | 8/2004 | Tai et al. .................... 73/754 |
| 2004/0237285 A1 * | 12/2004 | Rangsten et al. .......... 29/592.1 |

FOREIGN PATENT DOCUMENTS

| DE | 40 33 707 A1 | 4/1992 |
| GB | 2 187 888 A | 9/1987 |

OTHER PUBLICATIONS

The electrical response of thick-film resistors to hydrostatic pressure and uniaxial stress between 77 and 535 K, Nigel Fawcett, Martyn Hill, Sensors and Actuators Journal, vol. 78, pp. 114-119.

* cited by examiner

Primary Examiner—Edward Lefkowitz
Assistant Examiner—Andre Allen
(74) Attorney, Agent, or Firm—Mark P. Bourgeois (57) ABSTRACT A pressure sensor for sensing a pressure level of a medium. The pressure sensor includes a rigid substrate having a medium contacting side and a pressure sensitive resistor mounted on the medium contacting side. The resistor exhibits a change in resistance in response to pressure changes on the resistor above a predetermined threshold. Other embodiments of the invention are shown using a wheatstone bridge with pressure sensitive resistors and resistors that are insensitive to pressure changes.

12 Claims, 14 Drawing Sheets

PRESSURE SENSOR

PRIORITY

This application claims priority from U.S. Provisional patent application No. 60/490,648, filed Jul. 28, 2003, the entirety of which is incorporated by reference.

BACKGROUND

The present invention relates to pressure sensors in general and in particular to a pressure sensor that eliminates the use of a diaphragm between the sensor and pressure to be measured.

Conventional devices for high pressure measurement in severe environments rely on a diaphragm in conjunction with a pressure sensing element. Various pressure sensing elements have been used such as strain gages, piezoresistive devices and semiconductor based sensing elements. These devices are constructed such that the diaphragm is positioned between the pressurized process media and the pressure sensing element. The diaphragms are subject to mechanical fatigue and therefore limit the service life of conventional high pressure sensors. A diaphragm free high pressure sensor as presented herein is therefore desirable.

SUMMARY OF THE INVENTION

It is a feature of the present invention to provide a pressure sensor for sensing pressure of a media and providing an electrical signal that is indicative of the pressure level.

It is a feature of the present invention to provide a method for measuring pressure of a pressurized medium above a predetermined threshold pressure. The method uses a rigid substrate bearing a film resistor. The film resistor is exposed to the pressurized medium. The electrical resistance of the film resistor is detected.

It is a feature of the present invention to provide a high pressure sensor for detecting the pressure of a pressurized medium above a predetermined threshold pressure. The sensor includes a rigid substrate having a medium contacting side and an applied film resistor mounted on the medium contacting side. The resistor exhibits a change in resistance in response to pressure changes on the resistor above a predetermined threshold.

BRIEF DESCRIPTION OF THE DRAWINGS

It is noted that the drawings of the invention are not to scale. In the drawings, like numbering represents like elements among the drawings.

DETAILED DESCRIPTION

FIRST EMBODIMENT

Figure 1:
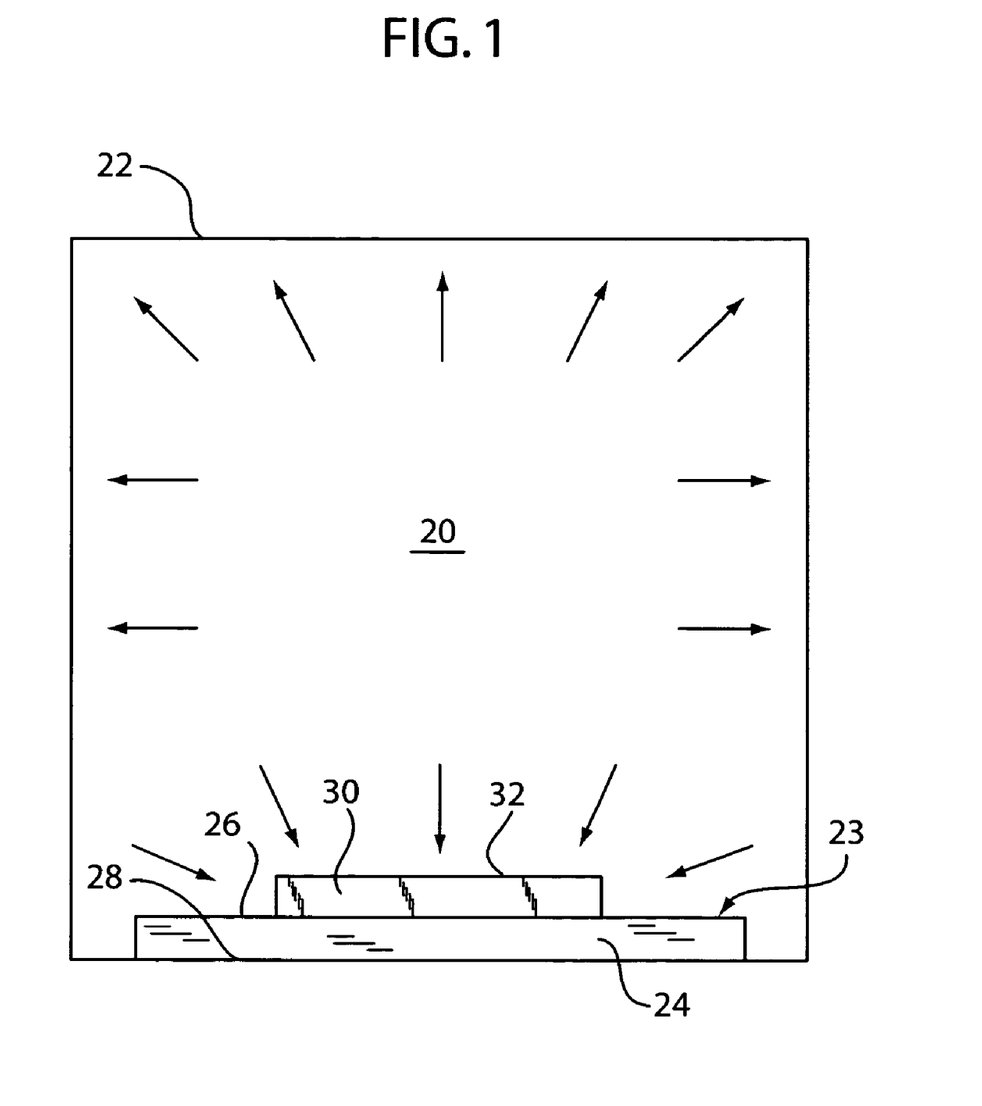
FIG. 1 is a cross-sectional view of a resistor in a pressurized medium.

Referring to FIG. 1, a pressure sensor 23 is shown inside a pressure vessel 22. Pressure vessel 22 contains a pressurized medium 20. Pressurized medium 20 can be any fluid medium that can be pressurized or compressed. For example, any liquid or gas. The arrows indicate that the pressurized medium is acting with equal or isostatic pressure against all surfaces of the pressure vessel 22. Pressure sensor 23 includes a rigid substrate 24 having a medium contacting surface 26 and a back surface 28 that may or may not be exposed to the pressurized medium. Surface 26 is at least partially exposed to the pressurized medium 20. A pressure sensitive resistor 30 is located on surface 26. Resistor 30 has a surface area 32 that is directly exposed and in contact with pressurized medium 20. The exposed surface area 32 and substrate are isostatically compressed by medium 20.

The resistor 30 can be an applied film resistor. Preferably resistor 30 is a thick film resistor that is screen printed onto a ceramic substrate 22 and fired in an oven. A preferred resistor composition is Heraeus 8241 resistor material which is commercially available from Heraeus Corporation of West Conshohocken, Pa. Other types of resistors can also be used such as thin film, discrete or diffused silicon resistors.

Figure 2:
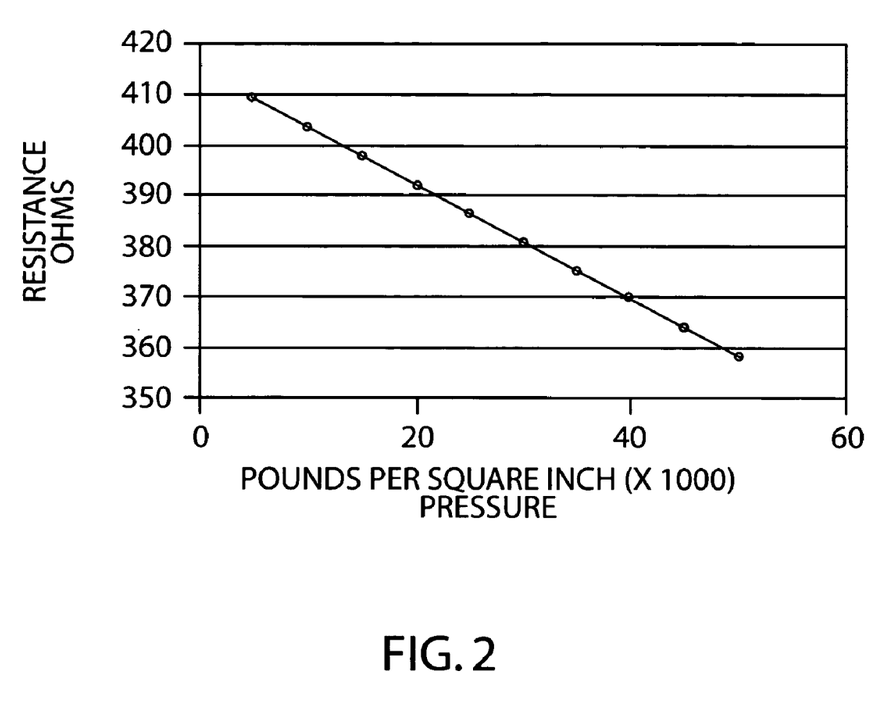
FIG. 2 is a graph of resistance versus pressure for the resistor of FIG. 1.
Figure 3:
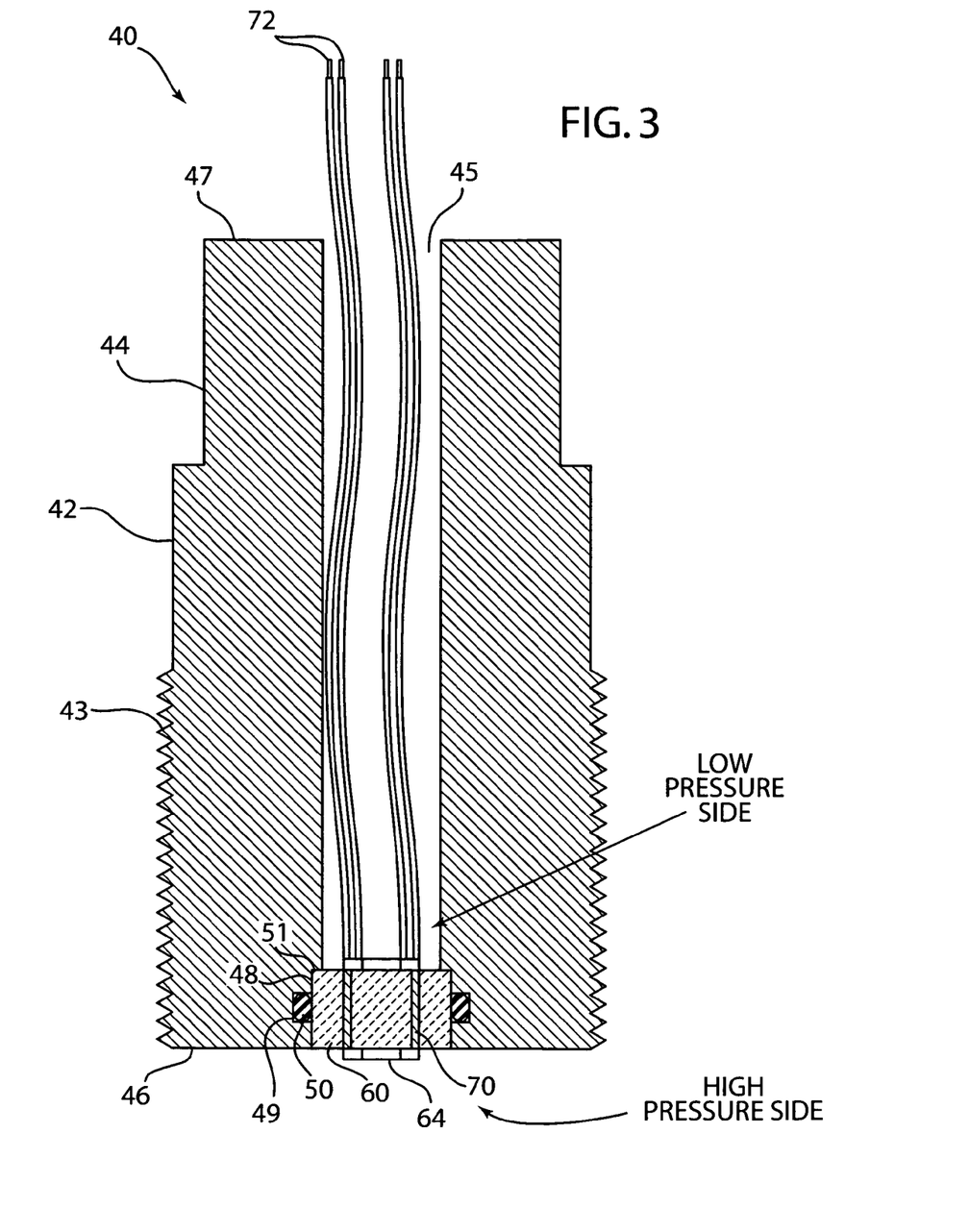
FIG. 3 is a cross-sectional view of a pressure sensor.
Figure 4:
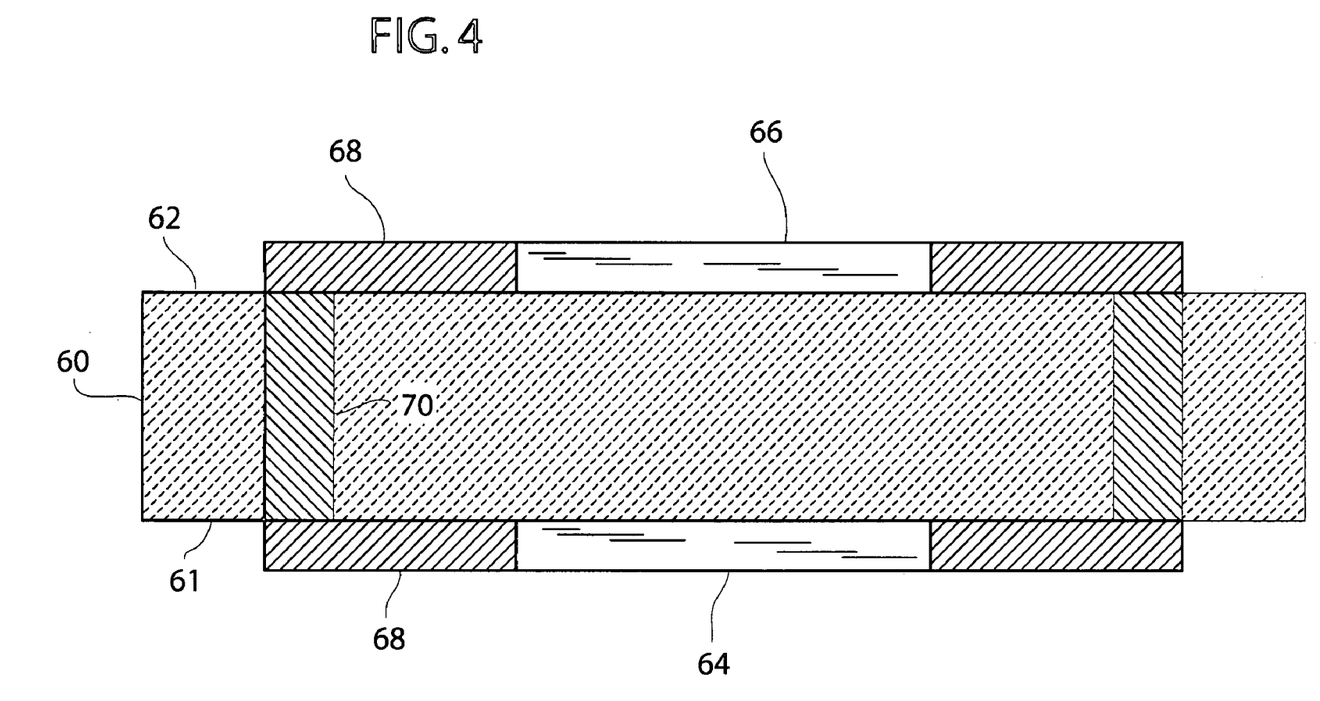
FIG. 4 is an enlarged cross-sectional view of the strain resistors and supporting substrate of FIG. 3.
Figure 5:
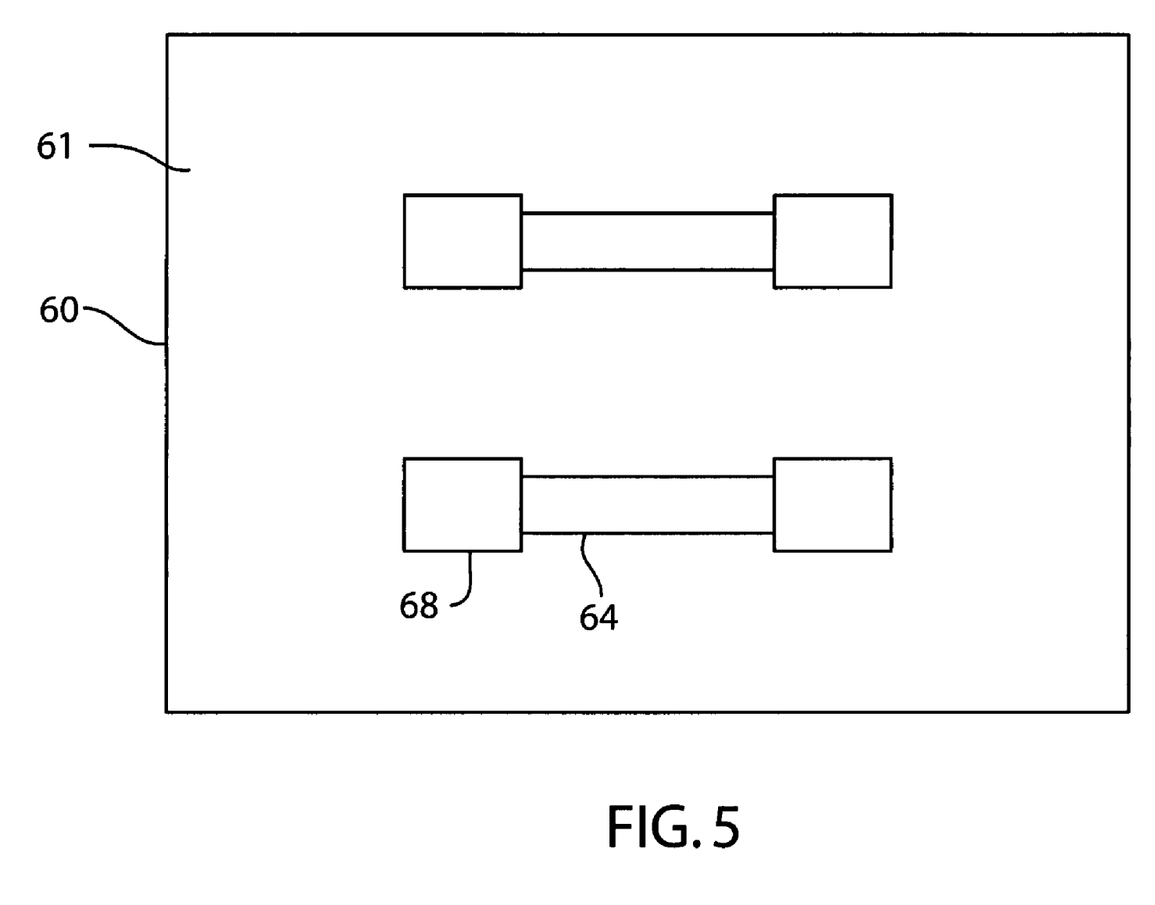
FIG. 5 is a top view of the strain resistors and supporting substrate of FIG. 4.
Figure 6:
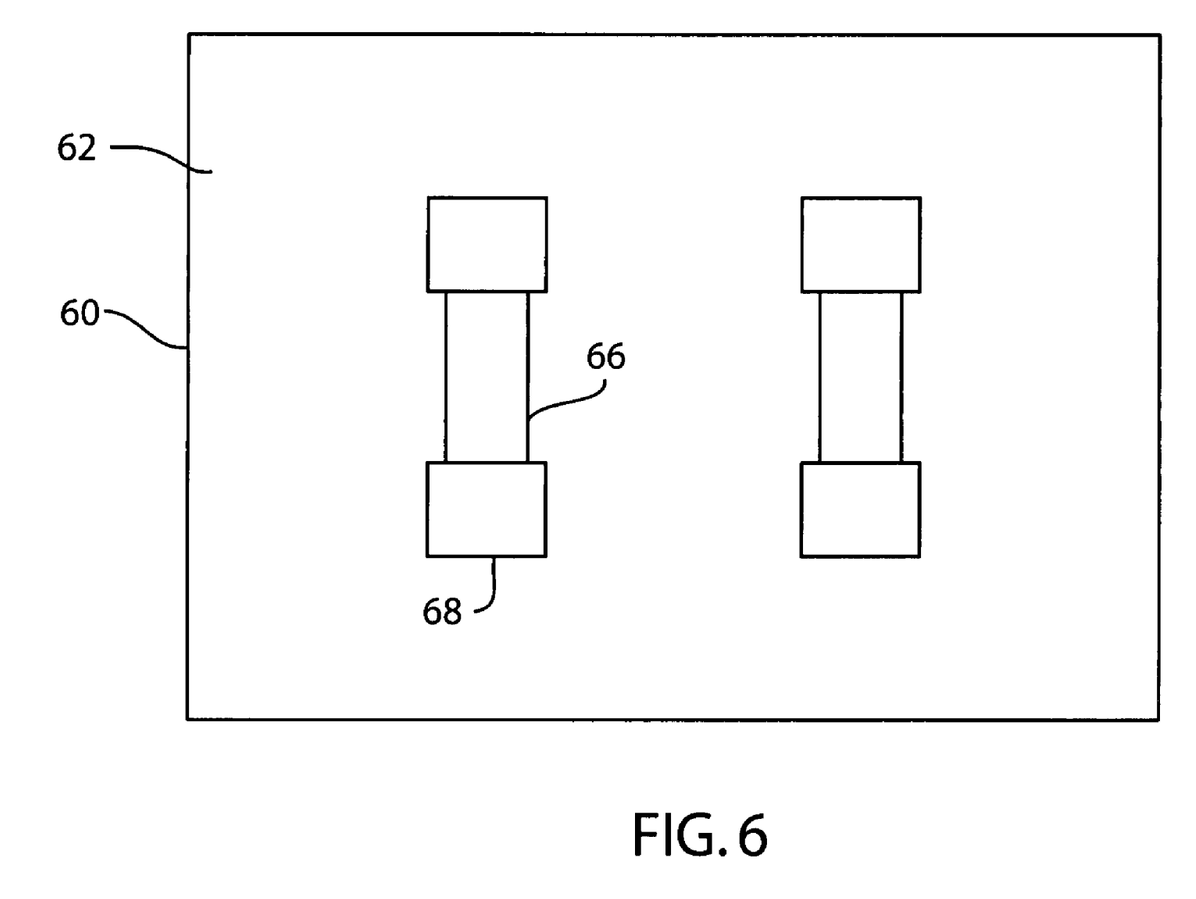
FIG. 6 is a bottom view of the strain resistors and supporting substrate of FIG. 4.

FIG. 2 shows a graph of resistance versus pressure for pressure sensor 23. The resistor changes resistance in response to the applied pressure level. The resistance across resistor 30 is about 410 ohms when medium 20 is pressurized to 5000 pounds per square inch. The resistance across resistor 30 is about 360 ohms when medium 20 is pressurized to 50,000 pounds per square inch. The resistance value is linear with pressure. The pressure was cycled between 5000 and 50,000 pound per square inch in order to test the hysteresis and repeatability of the pressure sensor. The sensor exhibited less than 0.2 percent error as it was cycled which is excellent for a pressure sensor. Resistor 30 has dimensions of x length, y width and z thickness. A resistor 30 that was fabricated and tested had dimensions of 0.014 inches in length, 0.014 inches in width and 10 microns in thickness. It is noted that substrate 24 is rigid and thick enough that it does not bend under pressure. In other words, substrate 24 does not act like a diaphragm.

Pressure sensor 23 is most useful for measuring large changes in pressure and for use with high pressures. This is due to the fact that the resistance change with pressure is small over a large pressure range. Pressure sensor 23 is best used with pressure ranges above 500 pounds per square inch. Pressure sensor 23 can be used to detect pressures down to 0 pounds per square inch (gauge pressure). In use, the rigid substrate 24 with a film resistor 30 is exposed to the pressurized medium 20 above a pre-determined threshold pressure. A voltage is applied across resistor 30 and the voltage drop across the resistor is converted to a resistance value using ohm's law. In this manner, the electrical resistance of the film resistor is detected. The pressure level of the medium is proportional to the resistance value.

PREFERRED EMBODIMENT

Turning now to FIGS. 3–6, a preferred embodiment of a pressure sensor 40 is shown. Pressure sensor 40 has a cylindrical housing 42 that has ends 46 and 47. A bore 45 extends through the center of housing 42. At end 46, the housing has a cavity 48 that extends into the bore 45. A step 51 is located at the bottom of cavity 48. The housing has an outer surface with male threads 43. The housing can be made out of metal such as stainless steel. Threads 43 are used to attach the pressure sensor to pressure vessel 22. Several flat surfaces 44 are placed on the outside of housing 42 so that a wrench can rotate the sensor. Male threads 43 would mate with female threads (not shown) on the pressure vessel. Other methods of attaching the housing could be used such as press fitting. Housing 42 has a groove 49 located around the circumference of cavity 48. 0-ring 50 fits into groove 49. 0-ring 50 makes a seal between housing 42 and substrate 60.

A substrate 60 is mounted in cavity 48. Substrate 60 has a medium contacting or pressurized surface 61 and a non-pressurized surface 62. Substrate 60 can be an alumina ceramic, low temperature co-fired ceramic, glass or a metal with an applied dielectric surface. A pair of pressurized resistors 64 are located on surface 61 and a pair of non-pressurized resistors 66 are located on surface 62. Resistors 64 are exposed to the pressurized medium. Resistors 66 are not exposed to the pressurized medium. Resistors 64 and 66 can be conventional thick film resistors that are manufactured using conventional thick film processing techniques. A preferred resistor composition is Heraeus 8241 resistor material which is commercially available from Heraeus Corporation of West Conshohocken, Pa. Resistors 64 and 66 can also be thin film resistors, plated resistors or resistors that are diffused into a silicon substrate. Conductors 68 are located at each end of resistors 64 and 66. Several conductive vias 70 extend through substrate 60 and electrically connect with conductors 68. Metal pins could also be used in place of the vias.

Resistors 64 and 66 are connected to form a Wheatstone bridge. In the Wheatstone bridge, resistors 64 are called the sense resistors and resistors 66 are called the reference resistors. Resistors 64 change resistance in response to pressure changes. Resistors 66 have a relatively constant value as they are not exposed to changes in pressure. Since the resistors 64 and 66 are thermally coupled by substrate 60, they operate at about the same temperature. This minimizes the amount of temperature compensation that is needed and allows for more accurate pressure readings.

Four wires 72 are connected to conductors 68 on surface 62. Wires 72 supply a voltage and ground potential to the resistors. The wires can be connected to the conductors by soldering or by welding. Conductors 68 could be connected to terminals or to a connector. Wires 72 would be connected with a power source and to conventional signal processing circuitry for calibration and temperature compensation.

Figure 7:
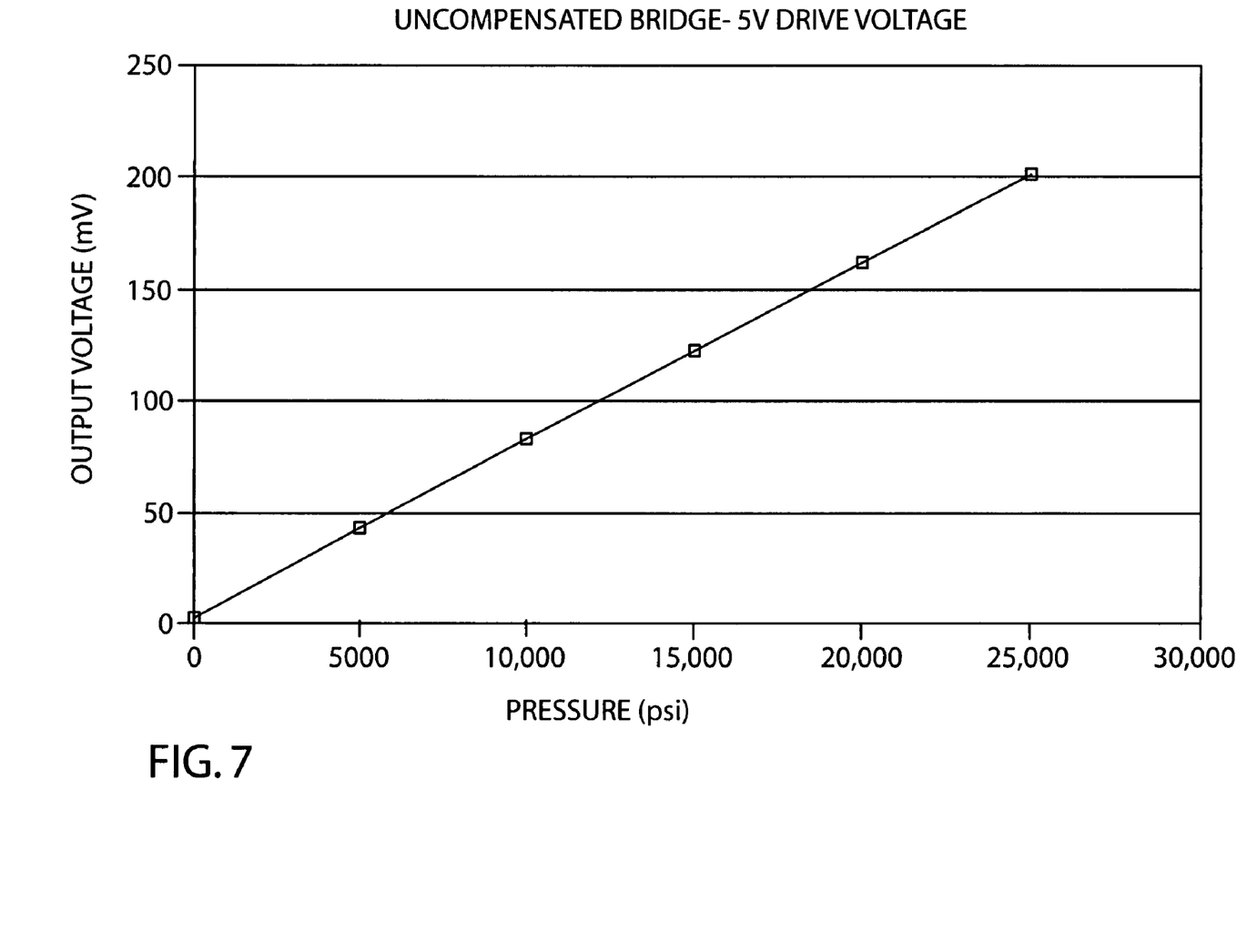
FIG. 7 is a graph of resistance versus pressure data for the pressure sensor of FIG. 3.
Figure 8:
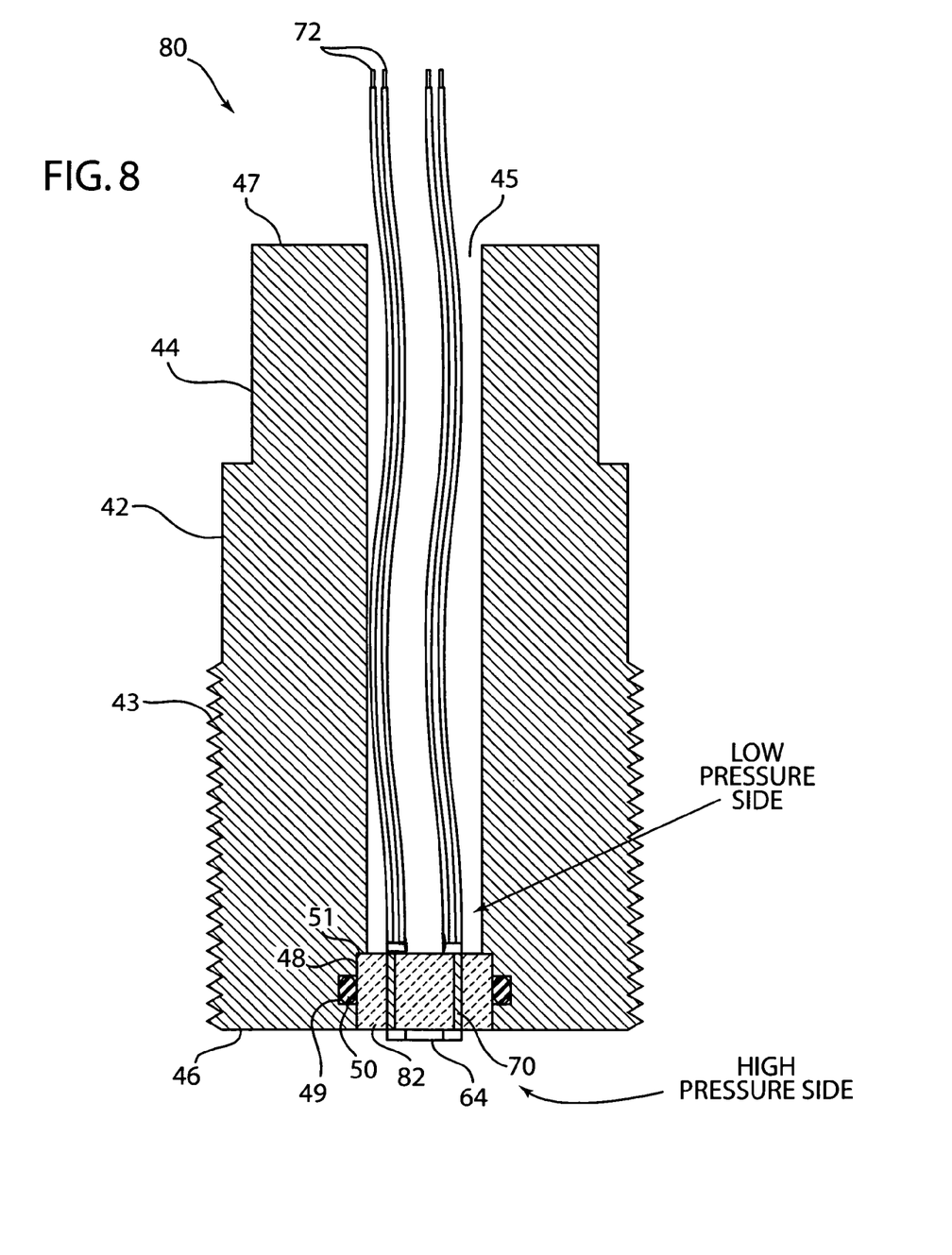
FIG. 8 is a cross-sectional view of another embodiment of a pressure sensor.
Figure 9:
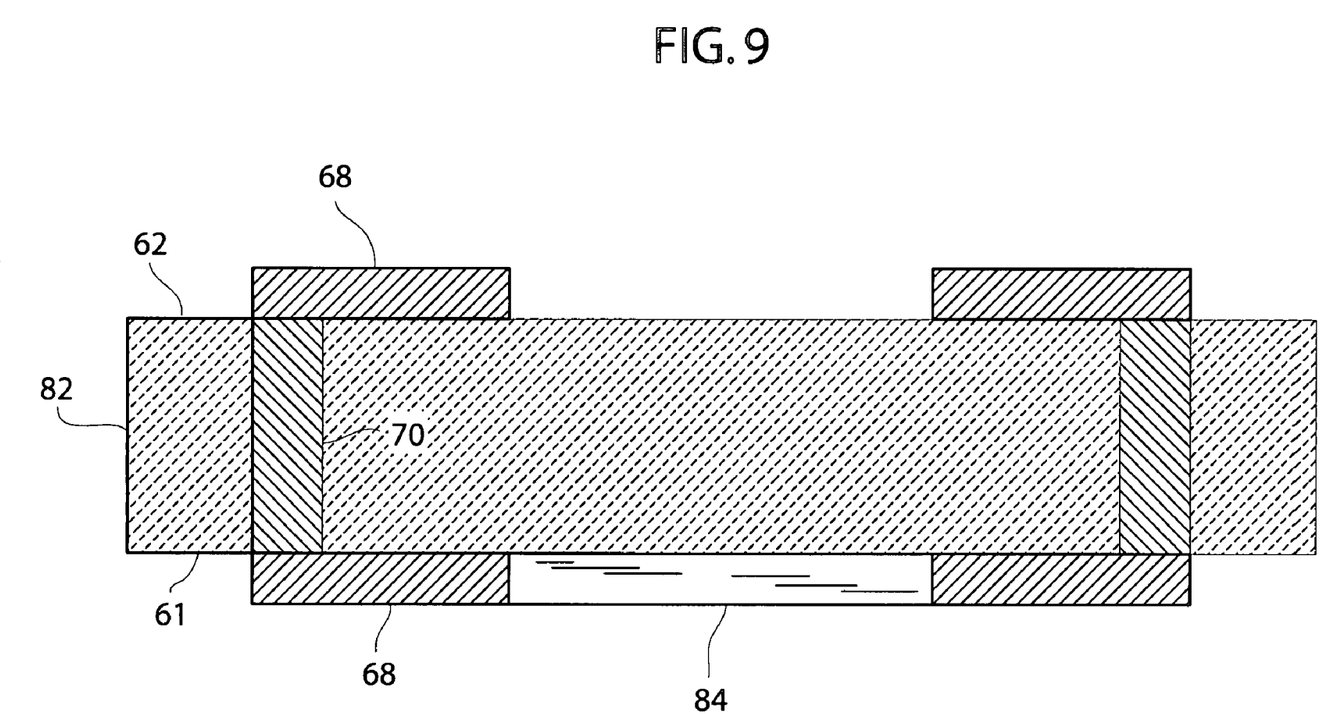
FIG. 9 is a cross-sectional view of the sensor substrate of FIG. 8.
Figure 10:
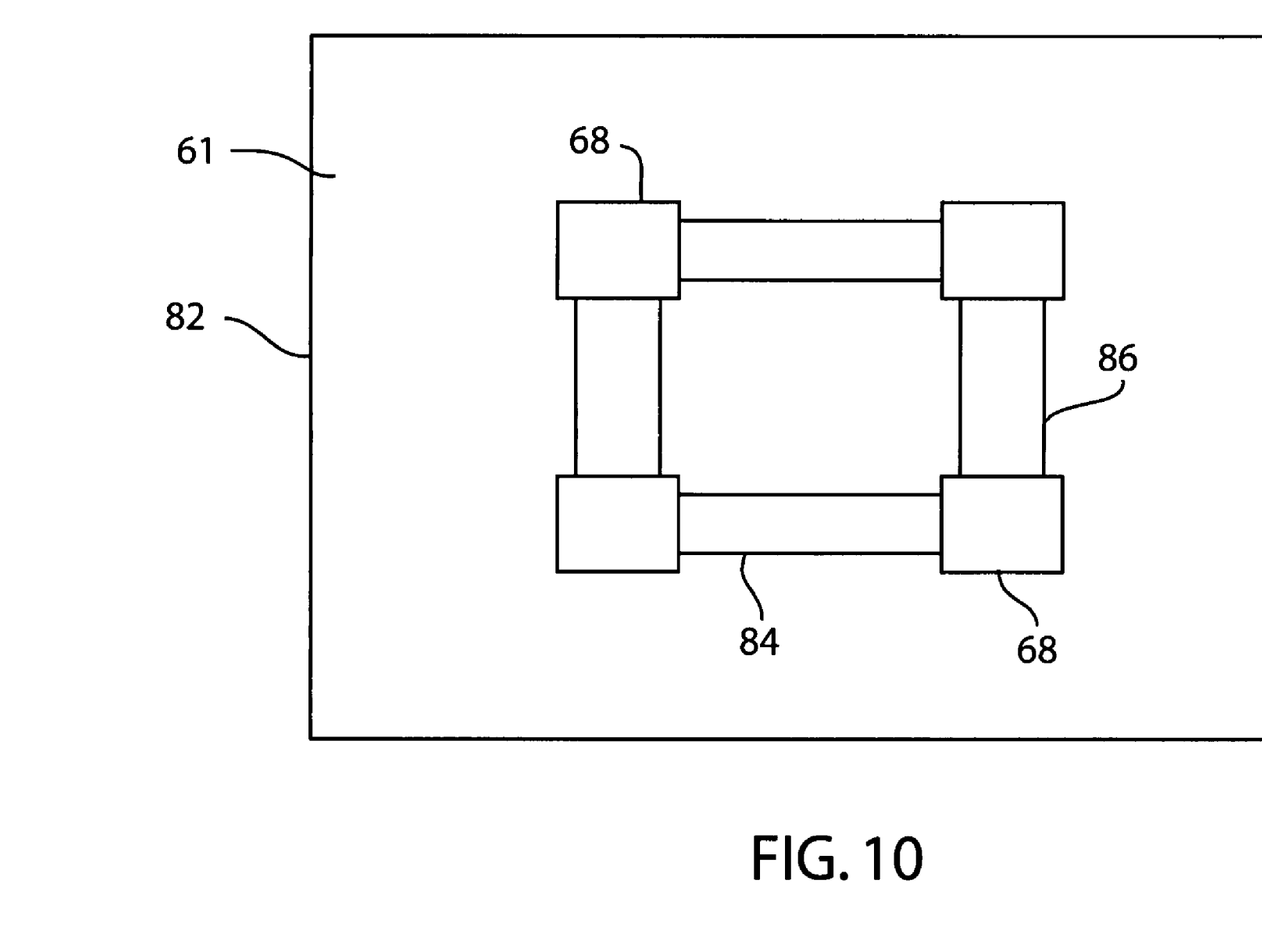
FIG. 10 is a top view of the substrate of FIG. 9.
Figure 11:
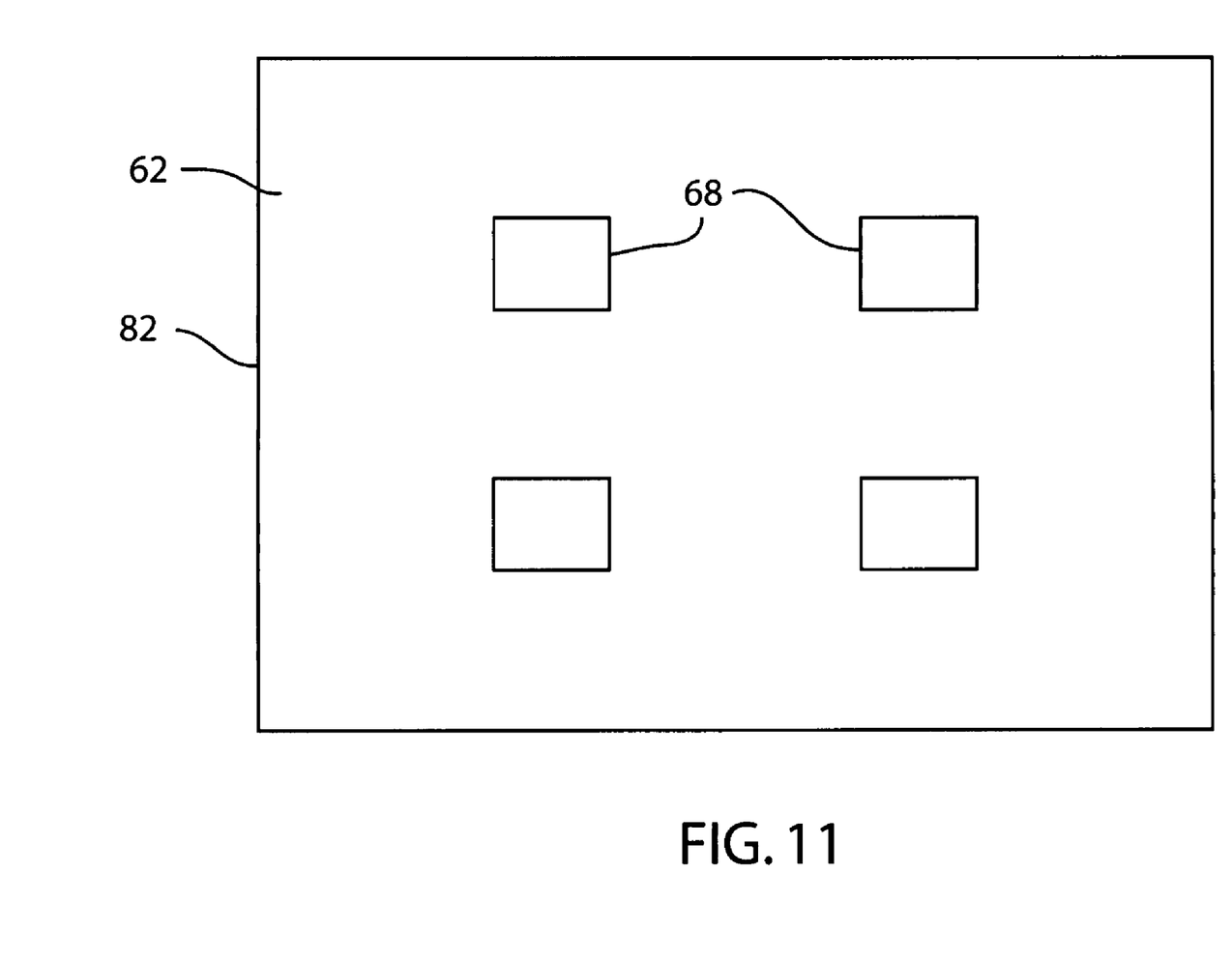
FIG. 11 is a bottom view of the substrate of FIG. 9.

FIG. 7 shows a graph of pressure versus output voltage without amplification for pressure sensor 40. The wheatstone bridge changes output voltage in response to the applied pressure level. The wheatstone bridge drive voltage is 5 volts and the bridge output was not compensated for temperature changes. The voltage is about 0 milli-volts when medium 20 is pressurized to 0 pounds per square inch. The voltage is about 200 milli-volts when medium 20 is pressurized to 25,000 pounds per square inch. The voltage is linear with pressure. For this example resistors 64 and 66 each had dimensions of 0.014 inches in length, 0.014 inches in width and 10 microns in thickness. The resistors were not laser trimmed. It is noted that substrate 60 is rigid and does not bend under pressure. In other words, substrate 24 does not act like a diaphragm. The pressure was repeatably cycled between 0 and 25,000 pounds per square inch in order to test the hysteresis and repeatability of the pressure sensor. The sensor exhibited less than 0.2 percent error as it was cycled which is excellent for a pressure sensor.

THIRD EMBODIMENT

Referring to FIGS. 8–11, another embodiment of a pressure sensor 80 is shown. Pressure sensor 80 is similar to sensor 40. In sensor 80, substrate 60 has been replaced by a substrate 82.

Substrate 82 has a medium contacting side 61, also referred to as a pressurized surface 61, and a non-pressurized surface 62. Ceramic substrate 82 can be an alumina ceramic or can be a low temperature co-fired ceramic. A pair of pressure sensitive resistors 84 are located on surface 61 and a pair of non-pressure sensitive resistors 86 are located on surface 61. Both resistors 84 and 86 are exposed to the pressurized medium. Resistors 84 and 86 can be conventional thick film resistors that are manufactured using conventional thick film processing techniques. Resistor 84 is made of Heraeus 8241 resistor material which is commercially available from Heraeus Corporation of West Conshohocken, Pa. Resistor 86 is made from Pyramide resistor material from CTS Corporation of Elkhart, Ind. Pyramide resistor material is made from a mixture of Ruthenium Oxide and Glass. It has a small particle size and does not change resistance under changes in pressure. Resistors 64 and 66 can also be thin film resistors, plated resistors or resistors diffused into a silicon substrate. Conductors 68 are located at each end of resistors 84 and 86. Several conductive vias 70 extend through substrate 82 and electrically connect with conductors 68. Metal pins could be used in place of vias 70.

Resistors 84 and 86 are connected to form a Wheatstone bridge. In the Wheatstone bridge, resistors 84 are called the sense resistors and resistors 86 are called the reference resistors. Resistors 84 change resistance in response to pressure changes. Resistors 86 have a relatively constant value as they are not responsive to changes in pressure. Locating the resistors 84 and 86 close to each other on the same substrate allows them to operate at about the same temperature. This minimizes the amount of temperature compensation that is needed and allows for more accurate pressure readings.

Four wires 72 are connected to conductors 68 on surface 62. Wires 72 supply a voltage and ground potential to the resistors. The wires can be connected to the conductors by soldering or by welding. Conductors 68 could be connected to terminals or to a connector. Wires 72 would be connected with a power source and to conventional signal processing circuitry for calibration and temperature compensation. The pressure versus output voltage for pressure sensor 80 would be similar to that for pressure sensor 40.

FOURTH EMBODIMENT

Figure 12:
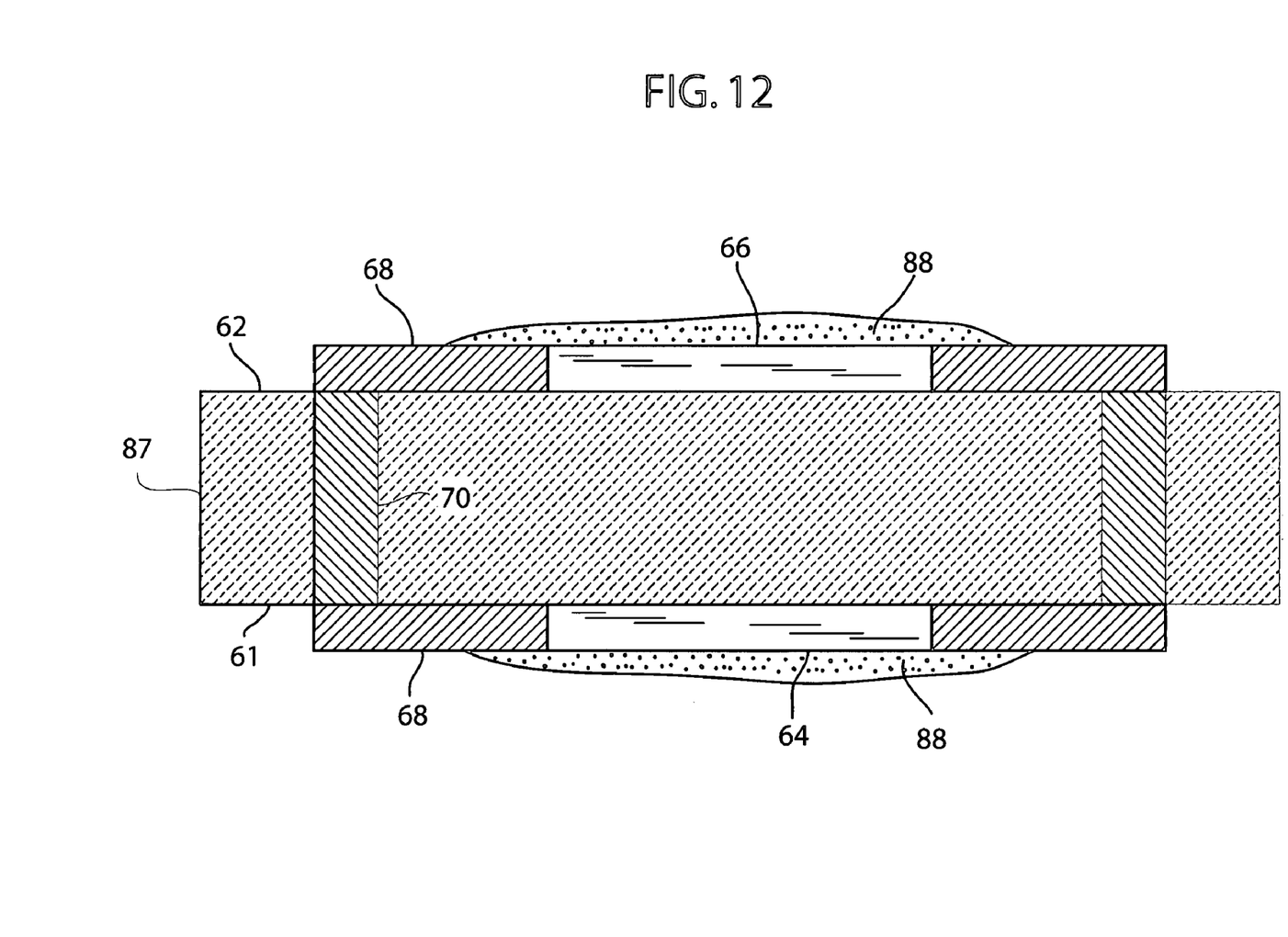
FIG. 12 is a cross-sectional view of an alternative sensor substrate.

Turning now to FIG. 12, a cross-sectional view of an alternative sensor substrate 87 is shown. Substrate 87 is similar to substrate 60 except that a covercoat 88 has been placed over resistors 64 and 66. Covercoat 88 can be a screened and fired glass covercoat or can be an organic covercoat such as preflorinated polyether. The covercoat protects the resistors from corrosive environments while at the same time allowing the resistors to be compressed by the applied pressure of the medium.

FIFTH EMBODIMENT

Figure 13:
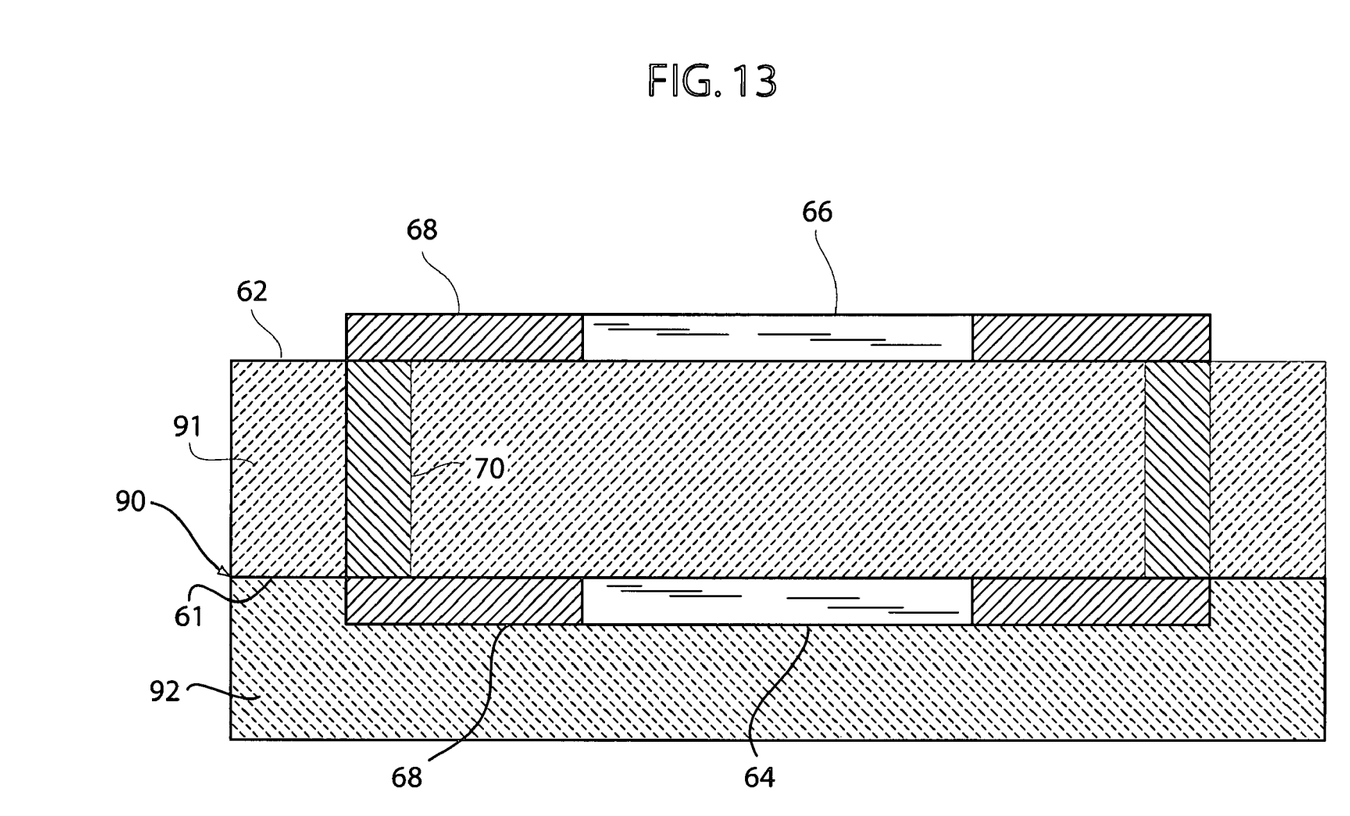
FIG. 13 is a cross-sectional view of another alternative sensor substrate.

Referring to FIG. 13, a cross-sectional view of an alternative sensor substrate 90 is shown. Substrate 90 is similar to substrate 60 except that the ceramic substrate 90 is now comprised of two layers 91 and 92 of a low temperature co-fired ceramic material (LTCC). LTCC materials are commercially available from Dupont Corporation of Wilmington, Del. Resistor 64 has been buried within the ceramic layers. The buried resistor is protected from corrosive environments while at the same time allowing the resistors to be compressed by applied pressure.

SIXTH EMBODIMENT

Figure 14:
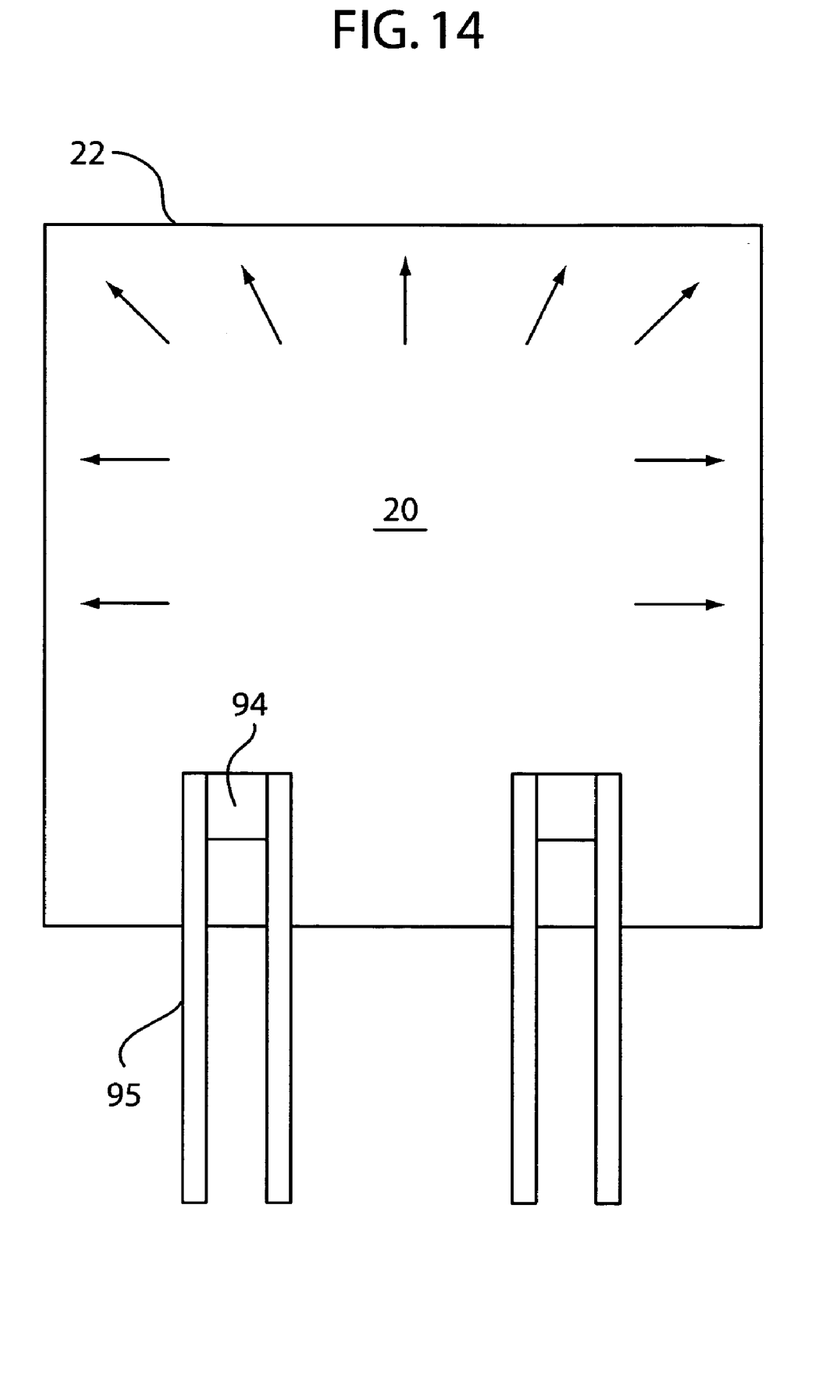
FIG. 14 is a cross-sectional view of an alternative resistor design in a pressurized medium.

Referring to FIG. 14, a cross-sectional view of an alternative resistor design in a pressurized medium is shown. In FIG. 14, a pair of resistors 94 are shown exposed to medium 20. Resistors 94 have a length, a width and a height that define a resistor volume. The resistor 94 has a resistance that varies with applied pressure. The resistor is in direct contact with the pressurized medium and is uniformly compressed by the pressurized medium such that the resistor volume changes with a change in pressure. The change in resistor volume generates a change in the resistance of the resistor. A pair of terminals 95 are attached to opposing sides of resistor 94. The terminals provide an electrical connection from the resistor to an external electrical circuit (not shown).

The resistors of FIG. 14 would preferably be connected in a wheatstone bridge configuration with two of the resistors being exposed to the pressurized medium and two of the resistors being out of the pressurized medium.

One of ordinary skill in the art of designing and using pressure sensors will realize many advantages from using the present invention. The elimination of the diaphragm of prior art sensors eliminates one of the major sources of sensor error and failure and also results in a lower cost assembly.

An additional advantage of the present invention is improved accuracy. Since the pressure sensitive resistors are in direct contact with the pressure vessel, the sensor can react directly to changes in pressure. Sensors of the prior art have a diaphragm located between the sensor and the pressure vessel. The diaphragm reduces response time and accuracy of the sensor.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pressure sensor for attachment to a pressure vessel comprising:
    a) a substrate communicated with the pressure vessel, the substrate having a first surface and a second surface, the first surface adapted to be directly exposed to a first pressure level contained within the pressure vessel, the second surface adapted to be exposed to a second pressure level;
    b) a first resistor mounted to the first surface, the first resistor responsive to the first pressure level; and
    c) a second resistor mounted to the second surface, the second resistor responsive to the second pressure level.

2. The pressure sensor according to claim 1, wherein the first resistor changes resistance in response to a change in the first pressure level.

3. The pressure sensor according to claim 1, wherein the second resistor has a substantially constant resistance in response to a substantially constant second pressure level.

4. The pressure sensor according to claim 1, wherein an electronic circuit is connected to the first and second resistors.

5. The pressure sensor according to claim 4, wherein the electronic circuit is adapted to receive an electrical signal as an input and provide a conditioned electrical signal as an output.

6. The pressure sensor according to claim 5, wherein the electrical signal is indicative of the first pressure level.

7. A pressure sensor for attachment to a pressure vessel comprising:
    a) a housing communicated with the pressure vessel;
    b) a substrate mounted to the housing,
    c) the substrate having a first surface and a second surface, the first surface adapted to be directly exposed to a first pressure level contained within the pressure vessel;
    d) a first resistor mounted to the first surface, the first resistor responsive to the first pressure level; and
    e) a second resistor mounted to the first surface, the second resistor having a low response to the first pressure level, the second resistor and the first resistor electrically connected.

8. The pressure sensor according to claim 7, wherein a terminal is mounted to the housing and is electrically connected to the resistors.

9. The pressure sensor according to claim 7, wherein the first resistor changes resistance in response to a change in the first pressure level.

10. The pressure sensor according to claim 7, wherein an electronic circuit is mounted to the housing, the electronic circuit electrically connected with the first and second resistors.

11. The pressure sensor according to claim 10, wherein the electronic circuit is adapted to receive an electrical signal as an input and provide a conditioned electrical signal as an output.

12. The pressure sensor according to claim 11, wherein the electrical signal is indicative of the first pressure level.

* * * * *